US011344058B2

(12) United States Patent
Han et al.

(10) Patent No.: US 11,344,058 B2
(45) Date of Patent: May 31, 2022

(54) ATOMIZING LIQUID GEL WITH REVERSIBLE PHASE TRANSITION CHARACTERISTICS, PREPARATION METHOD AND APPLICATIONS THEREOF

(71) Applicant: CHINA TOBACCO YUNNAN INDUSTRIAL CO., LTD, Kunming (CN)

(72) Inventors: Yi Han, Kunming (CN); Wei Zhao, Kunming (CN); Xiaowei Gong, Kunming (CN); Donglai Zhu, Kunming (CN); Tinghua Li, Kunming (CN); Shoubo Li, Kunming (CN); Xia Zhang, Kunming (CN); Liu Hong, Kunming (CN); Jun Wu, Kunming (CN); Yongkuan Chen, Kunming (CN); Xi Lv, Kunming (CN); Siyao Liao, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 0 days.

(21) Appl. No.: 17/288,928

(22) PCT Filed: Jun. 4, 2020

(86) PCT No.: PCT/CN2020/094429

§ 371 (c)(1),
(2) Date: Apr. 27, 2021

(87) PCT Pub. No.: WO2021/243657

PCT Pub. Date: Dec. 9, 2021

(65) Prior Publication Data

US 2022/0039456 A1 Feb. 10, 2022

(51) Int. Cl.
*A24B 15/30* (2006.01)
*A24B 15/167* (2020.01)
*A24B 15/28* (2006.01)

(52) U.S. Cl.
CPC .......... *A24B 15/302* (2013.01); *A24B 15/167* (2016.11); *A24B 15/285* (2013.01)

(58) Field of Classification Search
None
See application file for complete search history.

(56) References Cited

U.S. PATENT DOCUMENTS

2013/0189197 A1* 7/2013 Maruyama ............. A61K 8/922 424/49

FOREIGN PATENT DOCUMENTS

| | | | |
|---|---|---|---|
| CN | 103960783 | A | 8/2014 |
| CN | 104159992 | A | 11/2014 |
| CN | 108095199 | A | 6/2018 |

* cited by examiner

*Primary Examiner* — Dennis R Cordray
(74) *Attorney, Agent, or Firm* — Bayramoglu Law Offices LLC

(57) ABSTRACT

An atomizing liquid gel with reversible phase transition characteristics includes: a sugar-based gelling agent, 0.1-3.0 wt %; an atomizing liquid, 97.0-99.9 wt %; a molecule of the sugar-based gelling agent is a sugar molecule introduced with an amide group and/or an aryl group, and the sugar molecule optionally further includes at least one hydrophobic structural part selected from —$C_xH_y$, —O—$C_xH_y$ and

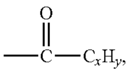

and x>2 and y>2. The atomizing liquid gel has characteristics of thermal reversible phase transition and/or shear reversible phase transition, a temperature of gel-sol phase transition is 100° C.-248° C., and a critical shear stress of the gel-sol phase transition is 40-800 Pa. Under heating and/or oscillation, the atomizing liquid gel converts from the gel state to a sol state, and the atomizing agent fixed in the gel releases to form an inhalable aerosol. When the heating and/or oscillation are stopped, the atomizing liquid gel is quickly recovered from the sol state to the gel state, and the unatomized atomizing agent is refixed in the gel. The use of the atomizing liquid gel solves the problem of liquid leakage of the liquid nicotine of the atomizer caused by the smoke condensate after the smoking stops, the change of air pressure or the action of external force during transportation.

20 Claims, No Drawings

ATOMIZING LIQUID GEL WITH REVERSIBLE PHASE TRANSITION CHARACTERISTICS, PREPARATION METHOD AND APPLICATIONS THEREOF

CROSS REFERENCE TO THE RELATED APPLICATIONS

This application is the national phase entry of International Application No. PCT/CN2020/094429, filed on Jun. 4, 2020, the entire contents of which are incorporated herein by reference.

TECHNICAL FIELD

The present invention belongs to the field of gel technology, and particularly to an atomizing liquid gel with reversible phase transition characteristics derived from carbohydrates, and a preparation method and applications thereof.

BACKGROUND

Supramolecular organogels are non-glassy and non-crystalline thermo-reversible solid materials, including three-dimensional networks (solid phase) made from wound and self-assembled gelling agent fibers and the organic continuous phase (liquid phase) fixed thereof. The main component of supramolecular organogels is organic liquids, which has rheological behavior and solid appearance. The continuous organic phase includes organic solvents, vegetable oils or mineral oils. Among them, the freezable organic solvents include aliphatic hydrocarbons and aromatic hydrocarbons, alcohols, silicone oil, dimethylsulfoxide and on the like. Gelling agents are small molecular weight organic gelling agents with relatively small molecular weight (~3,000 Da). Organic gelling agents are derived from long-chain alkanes or steroid derivatives, amino acid derivatives, ureas, carbohydrate systems, metal complexes, charge transfer complexes, macrocyclic substances and organic salts (ionic liquids), or other substances. They are also known as molecular building blocks, which are the basic structural skeleton for forming small molecular weight organic gelling agents. The small molecular weight organic gelling agents self-assemble into a three-dimensional network through non-covalent interactions such as hydrogen bonding, π-π stacking, Van der Waals' force, electrostatic interaction, and others. The organic solvent molecules are trapped and fixed into three-dimensional networks by interfacial forces to form viscoelastic gel materials. Because of their complex supramolecular structure, such gels are called supramolecular gels or physical gels.

Currently, organogels are typically used in topical drug delivery, dermal drug delivery, percutaneous drug delivery, parenteral drug delivery, oral drug delivery, in-situ organogels as mucosal adhesives, tablets and suppositories, microorganism culture, and other fields.

In recent years, small molecular weight organic gelling agents derived from carbohydrates have attracted much attention. This is because carbohydrates contain a plurality of hydroxyl functional groups, which have a wide range of hydrogen bonding, and the hydrogen bond has reversibility, specificity, directivity and cooperativity. Therefore, the carbohydrates can use their abundant intramolecular and intermolecular hydrogen bonding to self-assemble to prepare complex tissue systems, and the small molecular weight organic gelling agents derived from carbohydrates have more advantages in self-assembly by hydrogen bonding than the organic gelling agents such as amino acid derivatives and urea. The carbohydrates have the characteristics of structural richness, diversity of sugar units, sequence and connection sites, anomeric isomerism, chemical modification and/or substitution at different positions, tautomerism of conformational isomers and others, which are suitable for creating various unique organic gelling agents, water-based gelling agents and general gelling agents. By simply protecting or deprotecting multiple hydroxyl groups of carbohydrates, the properties of gelation can be easily adjusted. The precursor carbohydrate raw materials are cheap and commercially available, and can be derived from abundant renewable resources. The carbohydrates are usually biodegradable, non-toxic and environmentally friendly. The typical precursors used in the preparation of sugar-based small molecule gelling agents include D-maltose, D-sorbitol, L-ascorbic acid, trehalose, amygdalin, D-lactose, D-allose, D-mannose, D-galactose and D-glucose.

In the current popular electronic nicotine delivery system (e-cigarette), the liquid nicotine is usually atomized by electrothermal or ultrasonic atomization to form an aerosol to deliver nicotine and aroma components. At present, the leakage of liquid nicotine is a common problem in e-cigarettes, which has a substantial negative impact on the user experience. The reasons for the leakage of liquid nicotine in the e-cigarettes are as follows. 1. During transportation and storage, the e-cigarette liquid storage device (atomizer) filled with liquid nicotine often leaks due to air pressure, temperature or vibration. 2. Nicotine and aroma components are dissolved in an atomizing agent with glycerin and propylene glycol as the main components to form a uniform viscous liquid nicotine. During the process of electrothermal high-temperature atomization or ultrasonic atomization, the viscosity of liquid nicotine decreases and the fluidity will be enhanced. Additionally, due to the influence of the gas path system connected with the outside environment and the increase of the assembly gap of the e-cigarette due to thermal expansion during smoking, liquid nicotine easily leaks from the atomizer during and after smoking.

In order to solve or improve the liquid nicotine leakage problem of e-cigarettes, two main measures are currently used. The first includes the development and use of new liquid storage structures, guiding materials and sensing devices. This approach has provided some reduction in the leakage risk of liquid nicotine from the designs of the structure and gas path of the cigarette utensil and atomizer. The second measure is to use solid (semi-solid) nicotine to replace the existing liquid nicotine and develop a matching cigarette utensil to facilitate the storage and transportation of liquid nicotine and reduce the risk of liquid leakage. The first measure results in practical problems such as increased research and development costs, complex structure and complex manufacturing process, and the atomizer requires air circulation during use, and it is impossible to completely isolate the atomizer from the outside atmosphere. Therefore, the first measure is still difficult to control the leakage of liquid nicotine.

The solid (semi-solid) nicotine involved in the second measure not only has a complicated preparation process, but also has no reversible phase transition performance or has a low phase transition temperature. That is, the solid (semi-solid) liquid nicotine can only be melted by heat and cannot be restored to the original solid (semi-solid) state, or requires cooling to a lower temperature (such as 40° C.) to restore the original solid (semi-solid) state. As a result, even though the leakage of solid (semi-solid) liquid nicotine can be improved during storage and transportation process, when encountering the actual situations such as slightly higher ambient temperature, slight vibration and repeated fluctuations in the use temperature of the e-cigarette, the solid (semi-solid) nicotine is liquefied and is difficult to return to its original solid (semi-solid) state. The leakage problem of liquid nicotine thus still exists.

In order to solve the above problems, the present invention is provided.

SUMMARY

The first aspect of the present invention provides an atomizing liquid gel with reversible phase transition characteristics, including:

a sugar-based gelling agent, 0.1-3.0 wt %;

an atomizing agent, 97.0-99.9 wt %;

wherein, a molecule of the sugar-based gelling agent is a sugar molecule introduced with an amide group and/or an aryl group, and the sugar molecule optionally further includes at least one hydrophobic structural part selected from —$C_xH_y$, —O—$C_xH_y$ and $$-\overset{\overset{\displaystyle O}{\|}}{C}-C_xH_y;$$

and wherein x>2, y>2.

Preferably, the sugar-based gelling agent is selected from at least one of five types of sugar-based gelling agents I-V;

wherein, a chemical structural formula of the sugar-based gelling agent I is as follows:

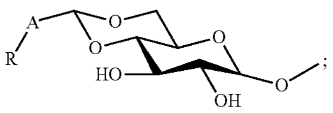

(sugar-based gelling agent I)

wherein,

A is an arylene group, or a heteroarylene group with 1-4 nitrogen heteroatoms; and R is —$C_xH_y$, —O—$C_xH_y$, or $$-\overset{\overset{\displaystyle O}{\|}}{C}-C_xH_y,$$

and x>2, y>2;

a chemical structural formula of the sugar-based gelling agent II is as follows:

$$S-A-NH-\overset{\overset{\displaystyle O}{\|}}{C}-R';$$

(sugar-based gelling agent II)

wherein,

S is a monosaccharide group, a maltose group, a cellobiose group, or a lactose group;

A is an arylene group, or a heteroarylene group with 1-4 nitrogen heteroatoms; and R' is a $C_{2-16}$ alkyl group, a $C_{2-16}$ alkenyl group, or a $C_{2-16}$ alkynyl group;

a chemical structural formula of the sugar-based gelling agent III is as follows:

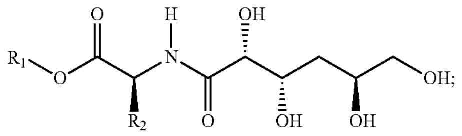

(sugar-based gelling agent III)

wherein, $R_1$ is a $C_{2-16}$ alkyl group, a $C_{2-16}$ alkenyl group, or a $C_{2-16}$ alkynyl group; and $R_2$ is

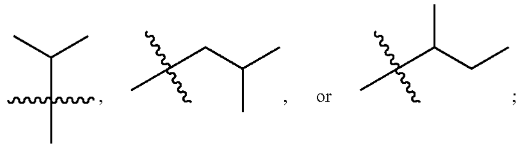

a chemical structural formula of the sugar-based gelling agent IV is as follows:

$$S-A-NH-\overset{\overset{\displaystyle O}{\|}}{C}-A(R)_n;$$

(sugar-based gelling agent IV)

wherein,

S is a monosaccharide group, a maltose group, a cellobiose group or a lactose group; and A $(R)_n$ is

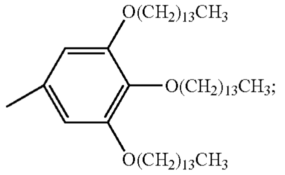

and a chemical structural formula of the sugar-based gelling agent V is as follows:

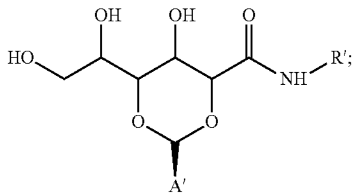

(sugar-based gelling agent V)

wherein,

A' is an aromatic alkylene group, or a heteroarylene alkylene group with 1-4 nitrogen heteroatoms; and R' is a $C_{2-16}$ alkyl group, a $C_{2-16}$ alkenyl group, or a $C_{2-16}$ alkynyl group.

The arylene group refers to a group formed by removing two hydrogen atoms from an aromatic ring molecule, and the two removed hydrogen atoms are located on different atoms; and the heteroarylene group is a pyridine group, a pyrimidine group, a pyrazole group, or a triazole group. The glycosyl group refers to a group formed by removing one hydrogen atom from a sugar molecule; the arylene group refers to a group formed by removing two hydrogen atoms from an aromatic ring molecule, and the two removed hydrogen atoms are located on different atoms. The aromatic alkylene group refers to a hydrocarbyl group linked to an aromatic ring as an alkylene group. The $C_{2-16}$ alkyl group, $C_{2-16}$ alkenyl group and $C_{2-16}$ alkynyl group are $C_{2-16}$ linear hydrocarbon groups. A substituent group can bond to a carbon atom or an oxygen atom of S.

Preferably, the chemical structural formula of the sugar-based gelling agent I is as follows:

formula 1

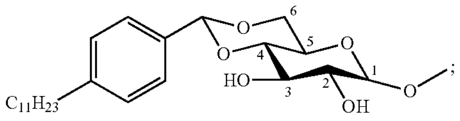

or formula 2

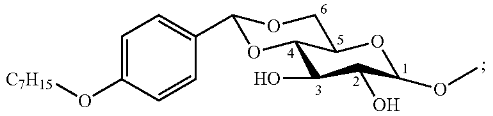

the chemical structural formula of the sugar-based gelling agent II is as follows:

formula 3

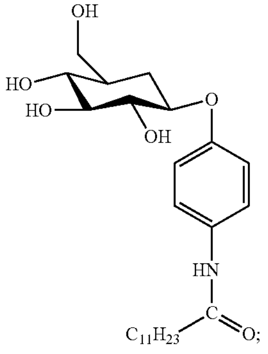

-continued formula 4

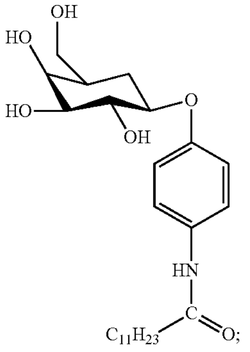

formula 5

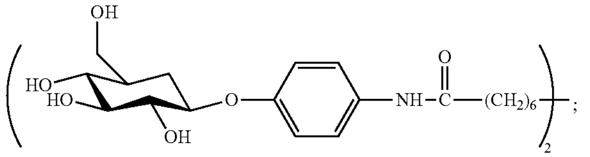

formula 6

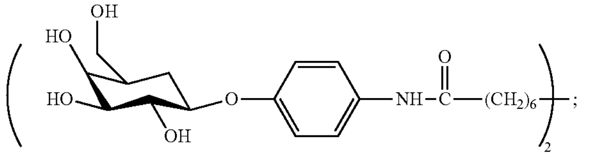

formula 7

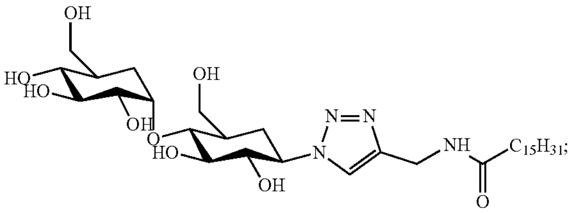

formula 8

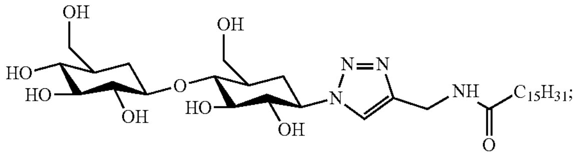

or formula 9

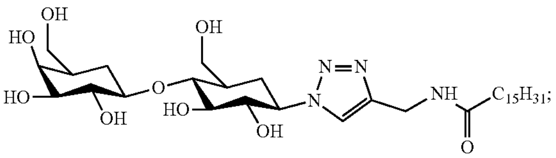

the chemical structural formula of the sugar-based gelling agent III is as follows:

formula 10

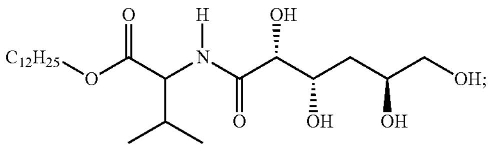

formula 11

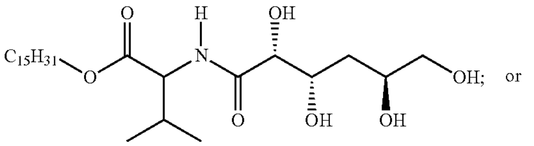

formula 12

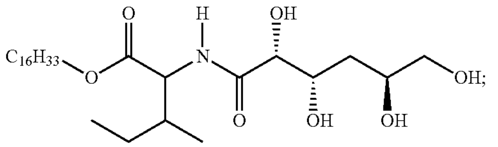

the chemical structural formula of the sugar-based gelling agent IV is as follows:

formula 13

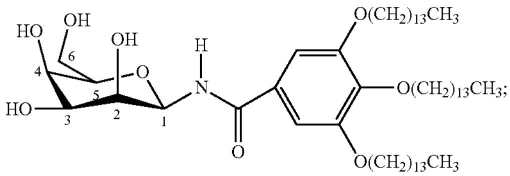

and the chemical structural formula of the sugar-based gelling agent V is as follows:

formula 14

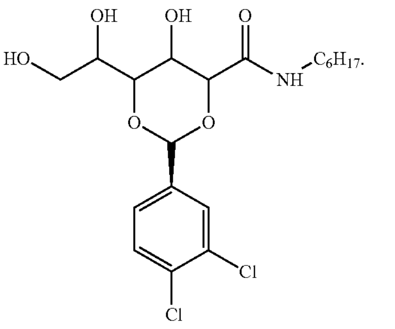

The atomizing liquid gel with reversible phase transition characteristics of the present invention includes a supramolecular three-dimensional network composed of an organic gelling agent with a small molecular weight, and a liquid atomizing liquid fixed in the network. The organic gelling agent with the small molecular weight in the atomizing liquid gel is a sugar-based gelling agent, which self-assembles to form a three-dimensional network through non-covalent interactions (such as hydrogen bonding, π-π stacking, Van der Waals' force, and electrostatic interaction). The atomized liquid material molecules are trapped and fixed in the three-dimensional network by interfacial forces to form a viscoelastic material, which has a complex supramolecular structure, so the atomizing liquid gel can be called a supramolecular gel or physical gel. Since the driving force for self-assembly to form the three-dimensional network is a reversible non-covalent interaction, the atomizing liquid gel has reversible phase transition characteristics.

In the present invention, the atomizing liquid gel with reversible phase transition characteristics means that the atomizing liquid gel has thermal reversible phase transition characteristics and/or shear reversible phase transition characteristics. The gel-sol phase transition temperature of the atomizing liquid gel is 190° C.-240° C., and the critical shear stress of the gel-sol phase transition of the atomizing liquid gel is 85-700 Pa. The thermal reversible phase transition characteristic means: when the temperature is lower than the gel-sol phase transition temperature ($T_{gel}$) of the atomizing liquid gel, the atomizing liquid gel is in a gel state; when the atomizing liquid gel is heated, and the temperature exceeds the gel-sol phase transition temperature ($T_{gel}$) of the atomizing liquid gel, the non-covalent action/interaction between the molecules of the sugar-based gelling agent is destroyed, the atomizing liquid gel rapidly melts into a sol state, meanwhile the liquid atomizing liquid fixed in the sugar-based gelling agent evaporates and atomizes, and the atomizing agent is released to form an inhalable aerosol; and when the temperature drops to below the sol-gel phase transition temperature ($T_{gel}$) of the atomizing liquid gel, the sugar-based gelling agent self-assembles to form a supramolecular gel network driven by non-covalent interactions between molecules, the molten sol quickly condenses and solidifies to restore the gel state, the non-atomized liquid atomizing liquid is fixed in the supramolecular gel network again, and the atomizing liquid gel returns to the gel state. Similarly, the shear reversible phase transition characteristic means: when the shear stress is lower than the critical shear stress for the gel-sol phase transition of the atomizing liquid gel, the atomizing liquid gel is in a gel state; when the atomizing liquid gel is subjected to oscillation and the shear stress increases, the non-covalent interaction between the molecules of the sugar-based gelling agent is destroyed, and the atomizing liquid gel converts from the gel state to a sol state, meanwhile the liquid atomizing liquid fixed in the sugar-based gelling agent evaporates and atomizes, and the atomizing agent is released to form an inhalable aerosol; and when the oscillation is stopped and the shear stress decreases, the sugar-based gelling agent self-assembles to form a supramolecular gel network driven by non-covalent interactions between molecules, the molten sol quickly condenses and solidifies to restore the gel state, the non-atomized liquid atomizing liquid is fixed in the supramolecular gel network again, and the atomizing liquid gel returns to the gel state.

The present invention provides the structural formulas of five types of sugar-based gelling agents, wherein a gel-sol phase transition temperature of the atomizing liquid gel prepared by the sugar-based gelling agent I is 100° C.-140° C., and a critical shear stress of the gel-sol phase transition of the atomizing liquid gel is 40-250 Pa. A gel-sol phase transition temperature of the atomizing liquid gel prepared by the sugar-based gelling agent II is 190° C.-240° C., and a critical shear stress of the gel-sol phase transition of the atomizing liquid gel is 85-700 Pa. A gel-sol phase transition temperature of the atomizing liquid gel prepared by the sugar-based gelling agent III is 135° C.-160° C., and a critical shear stress of the gel-sol phase transition of the atomizing liquid gel is 55-300 Pa. A gel-sol phase transition temperature of the atomizing liquid gel prepared by the sugar-based gelling agent IV is 188° C.-248° C., and a critical shear stress of the gel-sol phase transition of the atomizing liquid gel is 110-800 Pa. A gel-sol phase transition temperature of the atomizing liquid gel prepared by the sugar-based gelling agent V is 145° C.-220° C., and a critical shear stress of the gel-sol phase transition of the atomizing liquid gel is 60-560 Pa.

The advantages of the five types of sugar-based gelling agents provided by the present invention and the problems solved are as follows.

1. As the main component of the atomizing liquid, the atomizing agent includes glycerol and propylene glycol, both of which are polar media. The hydrogen bond donor and acceptor fragments of the traditional sugar-based gelling agents containing a large amount of hydroxyl groups are prone to solvation, which significantly reduces the strength of intermolecular hydrogen bonding of the sugar-based gelling agent, affects the stability of gelation of the three-dimensional network, and even leads to the miscibility of the sugar-based gelling agent with the atomizing liquid and fails to form the atomizing liquid gel.

In order to solve this problem, in the present invention, hydrophobic long aliphatic chains and aromatic rings are introduced into the sugar-based gelling agent to improve the Van der Waals' force, hydrophobic (solvophobic) effect, π-π stacking and other effects in the sugar-based gelling agent, so as to improve the strength of intermolecular hydrogen bonding of the sugar-based gelling agent, and further improve the intermolecular self-assembly ability of the sugar-based gelling agent. Additionally, the long aliphatic chains are hydrophobic, which can improve the hydrophobic (solvophobic) effect of the sugar-based gelling agent, thus weakening the influence of the solvation of glycerol and propylene glycol on the intermolecular hydrogen bonding of the gelling agent.

2. The intermolecular hydrogen bonding of sugar-based gelling agent is the main driving force for self-assembly. Glycerol and propylene glycol, as the main components of atomizing liquid, contain a large number of alcoholic hydroxyl groups. The hydrogen bonding between them and glycohydroxyl groups in sugar-based gelling agent will form a strong competition with the intermolecular hydrogen bonding of glycohydroxyl groups in sugar-based gelling agent itself, which weakens the intermolecular hydrogen bonding of sugar-based gelling agent and causes the poor rigidity and thermal stability of the gel. As a result, it is difficult to prepare an atomizing liquid gel with reversible phase transition characteristics suitable for high temperature conditions.

In order to solve this problem, the sugar-based gelling agent of the present invention is prepared by using sugar-based raw materials with more directed hydroxyl groups (such as cyclic sugar) or introducing additional hydrogen bond donor and acceptor groups (such as amide groups). In addition to the original intermolecular hydrogen bonding, such sugar-based gelling agent molecules can further form a strong cooperative hydrogen bond network to enhance the hydrogen bonding interaction and increase the hydrogen bond driving ability for self-assembly. As a result, the competitiveness of hydrogen bonds of alcohol hydroxyl groups in glycerol and propylene glycol is weakened, the network structure formed is more rigid, and the stability and rigidity are improved. Thus, the atomizing liquid gel with reversible phase transition characteristics is obtained, with a higher phase transformation temperature and a higher phase transformation shear stress.

According to the above content, the chemical structural formula of the sugar-based gelling agent I in the present invention is as follows:

formula 1

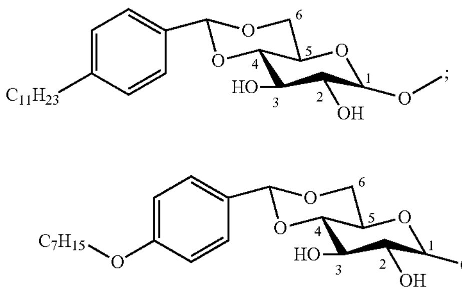

or formula 2

The sugar-based gelling agent I of the present invention is a methyl 4,6-O-benzylidene-α-D-glucopyranose derivative (formula 1 or formula 2), with a structure containing a glycosyl group with a cyclic sugar structure, a phenylene aromatic group and a hydrophobic hydrocarbyl group. The sugar-based gelling agent I of the present invention has the advantages as follows. 1. The cyclic sugar structure contains unmodified 2-OH and 3-OH, methyl-protected 1-OH, benzylidene-protected 4-OH and 6-OH, and the cyclic sugar structure can improve the hydrogen bonding effect between the molecules of the sugar-based gelling agent, thereby weakening the competitiveness of hydrogen bonds of the alcoholic hydroxyl groups in glycerol and propylene glycol, making the formed network structure more rigid, and improving the stability and rigidity. 2. The introduction of the phenylene can improve the π-π stacking effect, increase the length of hydrocarbon chain, and correspondingly introduce Van der Waals' force. Both of the π-π stacking effect and the Van der Waals' force can improve the intermolecular hydrogen bonding strength in sugar-based gelling agent, and the hydrophobic effect of the hydrocarbon chain can further enhance the hydrophobic (solvophobic) effect of sugar-based gelling agent, thus weakening the influence of the solvation of glycerol and propylene glycol on the intermolecular hydrogen bonding of the gelling agent. The isomerization of the above-mentioned configuration makes it capable of gelating the atomizing liquid, so as to obtain an atomizing liquid gel with reversible phase transition characteristics with higher phase transition temperature and higher phase transition shear stress.

The chemical structural formula of the sugar-based gelling agent II is as follows:

formula 3

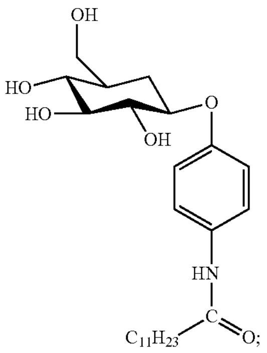

-continued formula 4

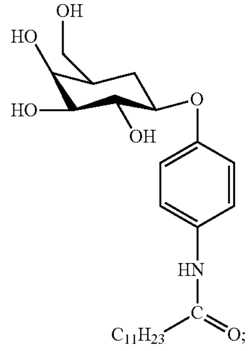

formula 5

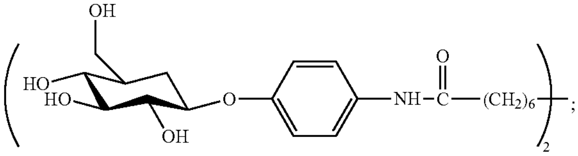

formula 6

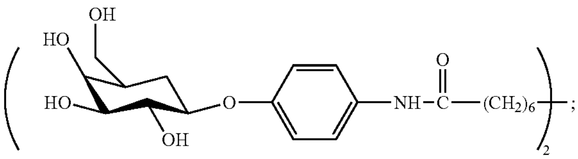

formula 7

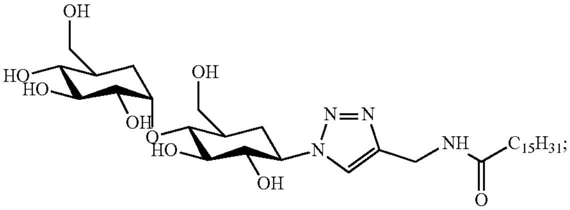

formula 8

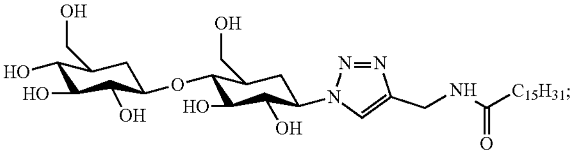

or formula 9

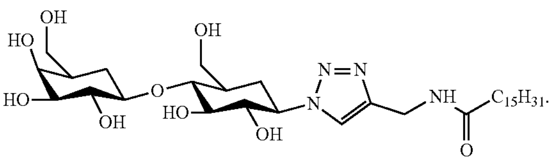

The structure of the sugar-based gelling agent III of the present invention contains a glycosyl group with a cyclic sugar structure, an amide group, an aromatic group and a hydrophobic hydrocarbon chain. The sugar-based gelling agent II of the present invention has the advantages as follows.

1. The cyclic sugar structure can improve the hydrogen bonding effect between the molecules of the sugar-based gelling agent, thereby weakening the competitiveness of hydrogen bonds of the alcoholic hydroxyl groups in glycerol and propylene glycol, making the formed network structure more rigid, and improving the stability and rigidity.

2. The introduction of the aromatic group can improve the π-π stacking effect, increase the length of hydrocarbon chain, and correspondingly introduce Van der Waals' force. Both of the π-π stacking effect and the Van der Waals' force can improve the intermolecular hydrogen bonding strength in sugar-based gelling agent, and the hydrophobic effect of the hydrocarbon chain can further enhance the hydrophobic (solvophobic) effect of sugar-based gelling agent, thus weakening the influence of the solvation of glycerol and propylene glycol on the intermolecular hydrogen bonding of the gelling agent.

3. By introducing hydrogen bond donors and acceptors (amide groups) into the glycosyl ligands, the hydroxyl hydrogen bonds of the glycosyl ligands can be orientated and polarized to form a hydrogen bond cooperative network and cooperative center, which greatly enhances the hydrogen bonding effect between the molecules of the sugar-based gelling agent, effectively inhibits the hydrogen bonding effect between the hydroxyl group of the glycerol/propylene glycol in the atomizing liquid and the hydroxyl group in the gelling agent to compete with the intermolecular hydrogen bond of the gelling agent, stabilizes the structure of the gel network, and greatly improves the thermal stability and the phase transition temperature of the gel. The isomerization of the above-mentioned configuration makes it capable of gelating the atomizing liquid, so as to obtain an atomizing liquid gel with reversible phase transition characteristics with higher phase transition temperature and higher phase transition shear stress.

The chemical structural formula of the sugar-based gelling agent III is as follows:

formula 10

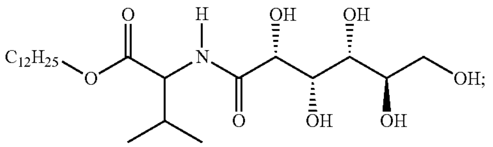

formula 11

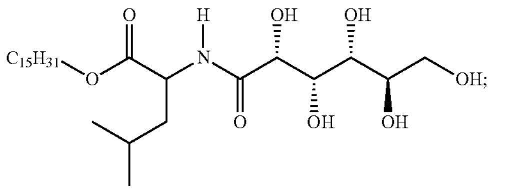

or formula 12

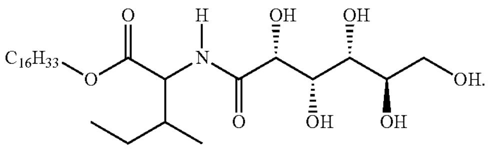

The structure of the sugar-based gelling agent III of the present invention contains a glycosyl group, an amide group and a hydrophobic hydrocarbyl group. The sugar-based gelling agent III of the present invention has the advantages as follows. 1. By introducing hydrogen bond donors and acceptors (amide groups) into the glycosyl ligands, the hydroxyl hydrogen bonds of the glycosyl ligands can be orientated and polarized to form a hydrogen bond cooperative network and cooperative center, which greatly enhances the hydrogen bonding effect between the molecules of the sugar-based gelling agent, effectively inhibits the hydrogen bonding effect between the hydroxyl group of the glycerol/propylene glycol in the atomizing liquid and the hydroxyl group in the gelling agent to compete with the intermolecular hydrogen bond of the gelling agent, stabilizes the structure of the gel network, and greatly improves the thermal stability and the phase transition temperature of the gel. 2. Increasing the length of hydrocarbon chain, and correspondingly introducing Van der Waals' force can improve the intermolecular hydrogen bonding strength in sugar-based gelling agent, and the hydrophobic effect of the hydrocarbon chain can further enhance the hydrophobic (solvophobic) effect of sugar-based gelling agent, thus weakening the influence of the solvation of glycerol and propylene glycol on the intermolecular hydrogen bonding of the gelling agent. The isomerization of the above-mentioned configuration makes it capable of gelating the atomizing liquid, so as to obtain an atomizing liquid gel with reversible phase transition characteristics with higher phase transition temperature and higher phase transition shear stress.

The chemical structural formula of the sugar-based gelling agent IV is as follows:

formula 13

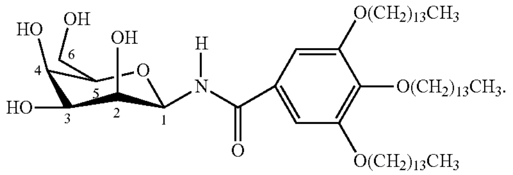

The structure of the sugar-based gelling agent IV of the present invention contains a glycosyl group, an amide group, an aromatic group and a hydrophobic hydrocarbon chain. The sugar-based gelling agent IV of the present invention has the advantages as follows.

1. The intramolecular hydrogen bond of a five-membered ring formed between amino group (—NH) and 2'-hydroxy group (2-OH) will polarize the second hydrogen bond (i.e., the intramolecular hydrogen bond of a six-membered ring between two biaxial hydroxyl groups 2-OH and 4-OH). As a result, the 4'-hydroxyl group (4-OH) becomes an effective cooperative donor, that is, a cooperative hydrogen bond network of 2-OH→4-OH→6-OH is formed. The 4-OH, as a cooperative donor, can form an additional intramolecular hydrogen bond with 6-OH, which may establish strong intermolecular hydrogen bond. In this way, the thermal stability and rigidity of the gel will be significantly improved. The cyclic sugar structure can improve the hydrogen bonding effect between the molecules of the sugar-based gelling agent, thereby weakening the competitiveness of hydrogen bonds of the alcohol hydroxyl groups in glycerol and propylene glycol, making the formed network structure more rigid and, improving the stability and rigidity.

2. The introduction of the aromatic group can improve the π-π stacking effect, increase the length of hydrocarbon chain, and correspondingly introduce Van der Waals' force. Both of the π-π stacking effect and the Van der Waals' force can improve the intermolecular hydrogen bonding strength in sugar-based gelling agent, and the hydrophobic effect of the hydrocarbon chain can further enhance the hydrophobic (solvophobic) effect of sugar-based gelling agent, thus weakening the influence of the solvation of glycerol and propylene glycol on the intermolecular hydrogen bonding of gelling agent.

3. By introducing hydrogen bond donors and acceptors (amide groups) into the glycosyl ligands, the hydroxyl hydrogen bonds of the glycosyl ligands can be orientated and polarized to form a hydrogen bond cooperative network and cooperative center, which greatly enhances the hydrogen bonding effect between the molecules of the sugar-based gelling agent, effectively inhibits the hydrogen bonding effect between the hydroxyl group of the glycerol/propylene glycol in the atomizing liquid and the hydroxyl group in the gelling agent to compete with the intermolecular hydrogen bond of the gelling agent, stabilizes the structure of the gel network, and greatly improves the thermal stability and the phase transition temperature of the gel. The isomerization of the above-mentioned configuration makes it capable of gelating the atomizing liquid, so as to obtain an atomizing liquid gel with reversible phase transition characteristics with higher phase transition temperature and higher phase transition shear stress.

The chemical structural formula of the sugar-based gelling agent V is as follows:

formula 14

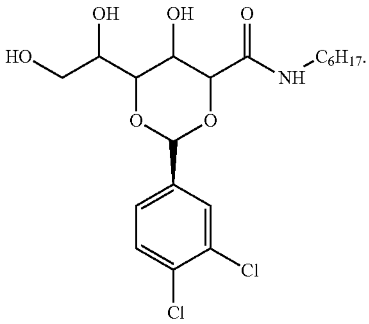

The structure of the sugar-based gelling agent V of the present invention contains a glycosyl group, an amide group, an aromatic group and a hydrophobic hydrocarbon chain. The sugar-based gelling agent V of the present invention has the advantages as follows.

1. The introduction of the aromatic group can improve the π-π stacking effect, increase the length of hydrocarbon chain, and correspondingly introduce Van der Waals' force. Both of the π-π stacking effect and the Van der Waals' force can improve the intermolecular hydrogen bonding strength in sugar-based gelling agent, and the hydrophobic effect of the hydrocarbon chain can further enhance the hydrophobic (solvophobic) effect of sugar-based gelling agent, thus weakening the influence of the solvation of glycerol and propylene glycol on the intermolecular hydrogen bonding of the gelling agent.

2. By introducing hydrogen bond donors and acceptors (amide groups) into the glycosyl ligands, the hydroxyl hydrogen bonds of the glycosyl ligands can be orientated and polarized to form a hydrogen bond cooperative network and cooperative center, which greatly enhances the hydrogen bonding effect between the molecules of the sugar-based gelling agent, effectively inhibits the hydrogen bonding effect between the hydroxyl group of the glycerol/propylene glycol in the atomizing liquid and the hydroxyl group in the gelling agent to compete with the intermolecular hydrogen bond of the gelling agent, stabilizes the structure of the gel network, and greatly improves the thermal stability and the phase transition temperature of the gel. The isomerization of the above-mentioned configuration makes it capable of gelating the atomizing liquid, so as to obtain an atomizing liquid gel with reversible phase transition characteristics with higher phase transition temperature and higher phase transition shear stress.

Preferably, based on a mass percentage of the atomizing liquid, the atomizing liquid includes: an atomizing agent, which accounts for 90-100 wt % of the atomizing liquid; nicotine, which accounts for 0-10 wt % of the atomizing liquid; and a perfume, which accounts for 0-10 wt % of the atomizing liquid.

The atomizing agent is a mixture of glycerol and propylene glycol, wherein a volume ratio of glycerol and propylene glycol is 3:7-7:3.

The atomizing liquid in the atomizing liquid gel is a solution that uses an atomizing agent as a main component or a carrier, and further contains or does not contain nicotine and/or aroma components (perfume) and other substances.

Under heating and/or oscillation, the atomizing liquid gel converts from the gel state to a sol state, and the atomizing agent fixed in the gel is released together with the dissolved substances such as the nicotine and the aroma components to form an inhalable aerosol. When the heating and/or oscillation are stopped, the sol state is returned to the gel state, and the atomizing agent, nicotine and aroma components that have not been atomized in the gel are refixed in the gel network.

The second aspect of the present invention provides a preparation method of the atomizing liquid gel, including heating and dissolving a sugar-based gelling agent in an atomizing liquid, stirring until the sugar-based gelling agent is completely dissolved to obtain a hot mixed solution, and slowly cooling the hot mixed solution to form the atomizing liquid gel.

During the preparation of the gel, by using different types and contents of sugar-based gelling agents and adjusting the types and proportions of various components of the atomizing liquid, a balance can be formed between the gelling agent-gelling agent interaction and the gelling agent-atomizing liquid interaction, so as to drive the formation of the gel without forming precipitation, crystals, or uniform solutions.

The third aspect of the present invention provides an application of the atomizing liquid gel, including directly injecting a molten solution of the atomizing liquid gel into a liquid storage tank of an electronic cigarette atomizer, and after the molten solution is cooled and gelled, an atomizing liquid gel cartridge suitable for electronic cigarettes is obtained.

When the gel is heated, highly sheared, and vigorously oscillated, because the non-covalent effect of the three-dimensional network structure formed by self-assembly is relatively weak, the network structure is destroyed, the viscosity of the gel decreases, and the trapped atomizing liquid is released. When the heating is stopped, the shear rate reduces or the high-speed shear stops, the gel has fast viscoelastic creep recovery, good thixotropic behavior, and can rapidly self-assemble, and the viscosity of the gel increases again. Therefore, when heated or vigorously oscillated (sheared), the gel has good reversibility to become a sol state; and when cooled or kept stationary (stop shearing), the gel forms rapidly. The above process can be repeated many times. In conclusion, the atomizing liquid gel of the present invention can be applied to electric heating or non-electric heating (such as high-frequency bulk acoustic wave and surface acoustic wave) and oscillating atomization devices.

The gel can be directly poured into the liquid storage tank of a commercially available electronic atomizer, and specifically, a hot solution of molten gel is directly injected into the liquid storage tank of the atomizer, and the solution is cooled and gelled. The preferred type of the atomizer is a disposable type (pre-filled type).

The gel can be made into atomizing liquid gel cartridges of different shapes that can be independently stored and packaged according to the market demand, the shape adaptability and operation mode of the heating device of the e-cigarette. The shape of the atomizing liquid gel cartridges can be small block, granule, column, or other shapes. Specifically, for an e-cigarette with a heating oil cup, an atomizing liquid gel cartridge with matching size and shape can be made according to the structure of the oil cup, and the gel cartridge can be placed in the oil cup during use. The atomizing liquid gel cartridge is suitable for a refillable e-cigarette atomizer.

The fourth aspect of the present invention provides an application of the atomizing liquid gel, including directly injecting a molten solution of the atomizing liquid gel into an aerosol generating device made of a porous material, cooling and gelling the molten solution to obtain the atomizing liquid gel, and fixing the atomizing liquid gel into the porous material.

The supramolecular gel can be poured into aerosol generating devices made of porous materials due to its excellent creep recovery and thixotropy. The aerosol generating device can integrate the functions of heating and/or oscillating atomization and storage of atomizing liquid gel. The types of the porous material include, but are not limited to, a single material or a composite material of a metal, an alloy, ceramics, a microelectromechanical system (MEMS) element, a carbon-based material, a high-molecular polymer, and others. Under heating and/or oscillation, the gel transitions from the gel state to a sol state, and the atomizing liquid fixed in the gel is released from the gel network and then atomized, and the generated aerosol is released from the micropores of the porous material. When the heating and/or oscillation are stopped, the colloidal gel is returned to the gel state, the atomizing liquid is refixed in the gel network, and the gel that solidifies and loses liquidity is confined in the porous material. According to the consumption and product requirements, the aerosol generating device can be replaced as a whole after the gel stored in the porous material is depleted, or the aerosol generating device can be injected with sol-state thermal gel into the pores of the porous material after the gel has been depleted, and then continue to be used after the thermal gel is cooled and solidified.

In this case, the atomizing liquid is first fixed to the three-dimensional network of the gel to form the atomizing liquid gel, and the atomizing liquid gel is then fixed to the porous material to form a doubly secure structural arrangement, which solves the leakage problem of the e-cigarette atomizer.

The fifth aspect of the present invention provides an application of the atomizing liquid gel, including coating a molten solution of the atomizing liquid gel to an inner surface of a cigarette paper of a heat-not-burn cigarette through sizing, cooling and gelling the molten solution to obtain the atomizing liquid gel, and fixing the atomizing liquid gel into fiber pores of the cigarette paper.

The atomizing liquid gel can be coated on the inner surface of cigarette paper suitable for the heat-not-burn cigarette by sizing. Due to the good creep recovery and thixotropy, the gel can penetrate into the fibrous pores of cigarette paper when heated in the sol state and be fixed in these pores after freezing into a gel. When the heat-not-burn cigarette is baked at low temperature, the gel in the cigarette paper undergoes a sol-phase transition, and the fixed atomizing liquid is heated and atomized. Moreover, the generated aerosol of the atomizing agent, nicotine and aroma components will be released together with the substances evaporated by heating the cigarette filling, which will increase the amount of smoke and enhance the flavor and fragrance. Due to the thermal and chemical stability of the supramolecular structure of the gel, the gel fixed in the cigarette paper remains stable during the production and storage of cigarettes.

Compared with the prior art, the present invention has the advantages as follows.

1. The atomizing liquid gel of the present invention has reversible phase transition characteristics, and the sugar-based gelling agent in the atomizing liquid gel is self-assembled to obtain a three-dimensional network through the non-covalent interactions (such as hydrogen bonding, π-π stacking, Van der Waals' force, and electrostatic effect). The atomized liquid material molecules are trapped and fixed in the three-dimensional network by interfacial forces to form the atomizing liquid gel. Since the driving force for self-assembly to form the three-dimensional network is a reversible non-covalent interaction, the atomizing liquid gel has the reversible phase transition characteristics. Under heating and/or oscillation, the atomizing liquid gel converts from the gel state to a sol state, and the atomizing agent fixed in the gel (or the atomizing agent carrying the dissolved substances such as nicotine and aroma components) is released to form an inhalable aerosol. When the heating and/or oscillation are stopped, the sol state is returned to the gel state, and the atomizing agent (or the atomizing agent, nicotine and aroma components) that have not been atomized in the gel are refixed in the gel network. The atomizing liquid gel of the present invention can be applied to electric heating or non-electric heating (such as high-frequency bulk acoustic wave and surface acoustic wave) and oscillating atomization devices.

2. The present invention provides five types of sugar-based gelling agents. The atomizing liquid gel prepared by the five sugar-based gelling agents has a higher gel-sol phase transition temperature (100° C.-248° C.), which is close to the evaporation and atomization temperature of the atomizing liquid, so that the sol-phase transformation of the atomizing liquid gel and the vaporization and atomization of the atomizing liquid tend to be synchronized. On the one hand, the risk of liquid leakage is greatly reduced, the waiting time for atomization is greatly shortened, and the utilization efficiency of heat is improved, so that the atomizing liquid can be atomized quickly. The liquid leakage is caused by the atomizing liquid being released from the gel but has not been atomized for a long time, which is caused by the fact that the phase transition temperature of gel is lower than the evaporation and atomization temperature (200° C.-250° C.) of the atomizing liquid during the heating process of the gel with low phase transition temperature (such as 60° C.-80° C.) in the prior art. On the other hand, and more importantly, it ensures that when the heating or cooling is stopped, the molten sol can quickly solidify due to the high sol-gel phase transition temperature ($T_{gel}$), and the unatomized atomizing liquid will be quickly fixed in the gel network to form the gel, which greatly reduces the risk of atomizing liquid leakage due to the long time required for the sol to solidify into a gel or the failure to gel again at all during the cooling process of the gel with low phase transition temperature. The sugar-based gelling agent network in the atomizing liquid gel of the present invention has excellent chemical stability, thermal stability and structural rigidity, and is suitable for products requiring high-temperature atomization of atomizing liquid, such as electronic cigarettes and heat-not-burn cigarettes.

3. The main characteristic of the atomizing liquid of the present invention that are different from the ordinary organic solvent is that it contains a large number of polar glycerin and propylene glycol, and contains polyol hydroxyl groups in the structure. Therefore, in the present invention, the competition between solvation and alcohol hydroxyl groups poses a great challenge to the selection of organic gelling agent for fixing the atomizing liquid, the stability of atomizing liquid gel and the achievement of a high transformation temperature. In the present invention, the sugar-based gelling agent with different functional groups obtained by modification greatly increases the strength of the non-covalent interaction in the gel network, and has the advantages for fixing atomizing liquid as follows. (1) The glycosyl ligand of the gelling agent contains a large number of hydroxyl groups, which can form strong intramolecular and intermolecular hydrogen bonding interactions, and become the main driving force for self-assembly to form a three-dimensional gel network. (2) By introducing aromatic rings and long-chain hydrocarbyl groups into glycosyl ligands, the non-hydrogen bonding interactions such as π-π stacking and Van der Waals' force are introduced based on the existing intermolecular hydrogen bonding interactions. The non-hydrogen bonding forces are adjusted by adjusting the electron cloud density of aromatic rings and the length of alkane chain. Meanwhile, the hydrophobic interaction of glycosyl ligands is further introduced, which compensates for the weakening effect of the solvation of polar polyols such as glycerol/propylene glycol in the atomizing liquid on the intermolecular hydrogen bonds of the sugar-based gelling agent. (3) By introducing hydrogen bond donors and acceptors (amide groups) into the glycosyl ligands, the hydroxyl hydrogen bonds of the glycosyl ligands can be orientated and polarized to form a hydrogen bond cooperative network and cooperative center, which greatly enhances the hydrogen bonding effect between the molecules of the sugar-based gelling agent, effectively inhibits the hydrogen bonding effect between the hydroxyl group of the glycerol/propylene glycol in the atomizing liquid and the hydroxyl group in the gelling agent to compete with the intermolecular hydrogen bond of the gelling agent, stabilizes the structure of the gel network, and greatly improves the thermal stability and the phase transition temperature of the gel.

4. The storage of the atomizing liquid gel of the present invention in the porous material can effectively reduce the mass loss of the atomizing liquid caused by throwing out, leakage or volatilization. According to the pore size and the pore capacity of the porous material, and the rheological property of the gel, the storage capacity of the atomizing liquid can be adjusted. By storing the atomizing liquid gel in the porous material, the probability of atomizing fluid contacting with external environment or air is greatly reduced, thereby reducing the risk of contamination, oxidation and volatilization loss of the atomizing fluid. The aerosol generating device integrated with the functions of heating and/or oscillating atomization and storing atomizing liquid gel has a high degree of integration, which can avoid using special liquid storage tank, greatly reduce the volume of the atomizer, and increase the portability of the e-cigarettes.

5. Due to the strong supramolecular network structure and relatively harsh phase transformation conditions, such as external temperature exceeding the phase transition temperature and violent oscillation, the atomizing liquid gel of the present invention will maintain its stable gel state under the same transport and storage conditions as the liquid atomizing liquid, thereby greatly reducing the problem of liquid leakage of the atomizer caused by air pressure changes during the air transportation process and air pressure changes at different altitude areas, and further greatly reducing the leakage risk caused by external forces such as slight collisions and oscillation.

6. The atomizing liquid of the present invention is fixed and encapsulated in a three-dimensional network of the gelling agent with stable properties, and the three-dimensional network of the gelling agent can lock the atomizing liquid inside, which is equivalent to providing a protective barrier for the atomizing liquid, and reduces the risks of contamination, oxidative deterioration and volatilization loss of the atomizing liquid.

DETAILED DESCRIPTION OF THE EMBODIMENTS

For the convenience of understanding, the technical solution of the present invention is further illustrated through specific embodiments. It should be understood by other skilled persons that the illustrated embodiments are merely intended to assist in the understanding of the present invention and therefore should not be regarded as a specific limitation of the present invention.

In the following embodiments, the gel-sol phase transition temperature is tested by the following method: a falling-ball method is used for determination, and the specific steps are as follows. The gel is placed in a test tube with a diameter of 10 mm, and a glass bead with a diameter of 5 mm and a mass of 0.24 g is placed on the top of the gel. Subsequently, the test tube is placed in a constant temperature oil bath, and heated at the heating rate of 1.5° C./min. The temperature at which the glass bead is completely submerged in the solution corresponds to the gel-sol phase transition temperature. The test is repeated twice to obtain an average value.

In the following embodiments, the critical shear stress of the gel-sol phase transition is tested according to the international standard method ISO 3219 (1993) *Plastics-Polymers/Resins in the Liquid State or as Emulsions or Dispersions-Determination of Viscosity Using a Rotational Viscometer with Defined Shear Rate.*

Embodiment 1

The present embodiment provides an atomizing liquid gel 1 with thermal reversible phase transition characteristics, which includes: a sugar-based gelling agent, 0.8 wt %; an atomizing liquid, 99.2 wt %. Based on the mass percentage of the atomizing liquid, the atomizing liquid includes: an atomizing agent, which accounts for 92.0 wt % of the atomizing liquid; nicotine, which accounts for 2.0 wt % of the atomizing liquid; a perfume, which accounts for 6.0 wt % of the atomizing liquid. The atomizing agent is a mixture of glycerol and propylene glycol, in which a volume ratio of the glycerol and the propylene glycol is 5:5.

The chemical structural formula of the sugar-based gelling agent is as follows:

formula 1

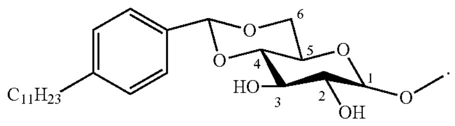

The atomizing liquid gel 1 solution of the present embodiment is directly injected into a liquid storage tank of an e-cigarette atomizer. After the solution is cooled and gelled, an atomizing liquid gel cartridge 1 suitable for e-cigarette is prepared, which is used in the e-cigarette. The gel-sol phase transition temperature is 125° C., which is close to the evaporation and atomization temperature of the atomizing liquid. After being heated to 220° C., the atomizing liquid gel converts from the gel state to a sol state, the atomizing agent fixed in the gel is released together with the dissolved substances of nicotine and aroma components to form an inhalable aerosol. The heating is stopped after smoking a few puffs. When the temperature of the e-cigarette drops below the gel-sol phase transition temperature, the gel at the sol state is recovered to the gel state, and the atomizing agent, nicotine and aroma component molecules that have not been atomized in the gel are refixed in the gel network. It can be seen that the atomizing liquid gel 1 prepared by the present embodiment has obvious thermal reversible phase transition characteristics. After repeated smoking for several times, the phase transition property of the atomizing liquid gel 1 is still very obvious. Therefore, the atomizing liquid gel 1 prepared by the present embodiment is suitable for the e-cigarette products that require high-temperature atomization of the atomizing liquid.

Embodiment 2

The present embodiment provides an atomizing liquid gel 2 with shear reversible phase transition characteristics, and the chemical structure formula of the sugar-based gelling agent used is as follows:

formula 2

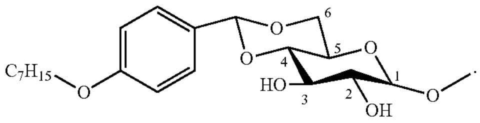

The other preparation conditions and the proportion of each component are the same as those in embodiment 1.

The molten atomizing liquid gel 2 solution of the present embodiment is directly injected into a liquid storage tank of an atomizer, and an atomizing liquid gel cartridge 2 is prepared after the solution is cooled and gelled, which is used in a high-frequency bulk acoustic wave oscillation atomization device. The critical shear stress of the gel-sol phase transition is 185 Pa. Under high shear and violent oscillation (the frequency of sound wave is 2.4 MHz), the gel network structure is destroyed, the viscosity of the gel decreases, and the trapped atomizing liquid is released to produce an inhalable aerosol. After smoking for several times, the oscillation is stopped, the gel is quickly self-assembled, and the viscosity of the gel increases again. The above process can be repeated many times. In conclusion, the atomizing liquid gel of the present invention can be applied to a high-frequency bulk acoustic wave oscillation atomization device.

Embodiment 3

The present embodiment provides an atomizing liquid gel 3 with thermal reversible phase transition characteristics, and the chemical structure formula of the sugar-based gelling agent used is as follows:

formula 3

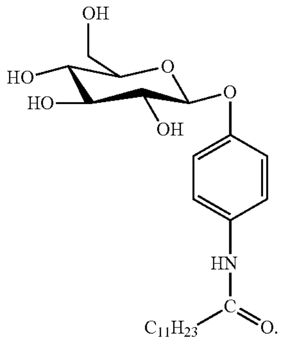

The other preparation conditions and the proportion of each component are the same as those in embodiment 1.

The sugar-based gelling agent of present embodiment has the advantages as follows.

1. In the sugar-based gelling agent, one side is a hydrophobic hydrocarbyl fragment, and the other side is a hydrophilic glycosyl ligand, which is similar to a surfactant. The strong hydrogen bonding interaction in the glycosyl ligand leads to the extension of unidirectional molecular self-assembly, resulting in the formation of a fiber or ribbon-like 3D network. The amphipathic structure is suitable for gelation of complex atomizing liquid systems containing polar components such as glycerol and propylene glycol, and non-polar volatile components such as aromatic alcohols.

2. The hydrophobic hydrocarbyl fragment on one side increases the length of the hydrocarbon chain, and correspondingly introduces Van der Waals' force. Moreover, the introduction of intermediate group of aromatic ring can correspondingly introduce π-π stacking effect, or introduce Van der Waals' force and π-π stacking effect, which can not only enhance the intermolecular hydrogen bonding strength of the sugar-based gelling agent, but also weaken the influence of the solvation of glycerol and propylene glycol on the intermolecular hydrogen bonding interaction of the gelling agent, thereby improving the stability of the sugar-based gelling agent to fix the atomizing liquid, further increasing the diversity of gelation, and increasing the gelation temperature.

3. The sugar-based gelling agent uses a cyclic sugar with more directed hydroxyl groups as the sugar-based raw material, and introduces additional hydrogen bond groups (such as amide groups) into the sugar-based raw material to prepare the sugar-based gelling agent. In addition to the original intermolecular hydrogen bonding interaction, such sugar-based gelling agent molecules can further form a strong cooperative hydrogen bond network, and increase the hydrogen bond driving ability for self-assembly. As a result, the competitiveness of hydrogen bonds of alcoholic hydroxyl groups in glycerol and propylene glycol is weakened, the network structure formed is more rigid, and the thermal stability and thermal reversible phase transition temperature are improved.

The atomizing liquid gel 3 solution of the present embodiment is directly injected into a liquid storage tank of an e-cigarette atomizer. After the solution is cooled and gelled, an atomizing liquid gel cartridge 3 suitable for e-cigarette is prepared, which is used in the e-cigarette. The gel-sol phase transition temperature is 205° C., which is close to the evaporation and atomization temperature of the atomizing liquid. After being heated to 220° C., the atomizing liquid gel converts from the gel state to a sol state, the atomizing agent fixed in the gel is released together with the dissolved substances of nicotine and aroma components to form an inhalable aerosol. The heating is stopped after smoking a few puffs. When the temperature of the e-cigarette drops below the gel-sol phase transition temperature, the gel at the sol state is recovered to the gel state, and the atomizing agent, nicotine and aroma component molecules that have not been atomized in the gel are refixed in the gel network. It can be seen that the atomizing liquid gel 3 prepared by the present embodiment has obvious thermal reversible phase transition characteristics. After repeated smoking for several times, the phase transition property of the atomizing liquid gel 3 is still very obvious. Therefore, the atomizing liquid gel 3 prepared by the present embodiment is suitable for the e-cigarette products that require high-temperature atomization of the atomizing liquid.

Embodiment 4

The present embodiment provides an atomizing liquid gel 4 with shear reversible phase transition characteristics, and the chemical structure formula of the sugar-based gelling agent used is as follows:

formula 4

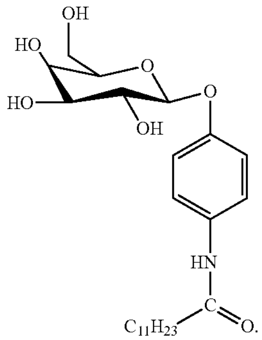

The other preparation conditions and the proportion of each component are the same as those in embodiment 1.

The molten atomizing liquid gel 4 solution of the present embodiment is directly injected into a liquid storage tank of an atomizer, and an atomizing liquid gel cartridge 4 is prepared after the solution is cooled and gelled, which is in a high-frequency bulk acoustic wave oscillation atomization device. The critical shear stress of the gel-sol phase transition is 580 Pa. Under high shear and violent oscillation (the frequency of sound wave is 2.4 MHz), the gel network structure is destroyed, the viscosity of the gel decreases, and the trapped atomized liquid is released to produce an inhalable aerosol. After smoking for several times, the oscillation is stopped, the gel is quickly self-assembled, and the viscosity of the gel increases again. The above process can be repeated many times. In conclusion, the atomizing liquid gel of the present invention can be applied to a high-frequency bulk acoustic wave oscillation atomization device.

Embodiments 5-6

These embodiments respectively provide an atomizing liquid gel 5 and an atomizing liquid gel 6 with thermal reversible phase transition characteristics, and the chemical structure formulas of the sugar-based gelling agent used are respectively presented as follows:

formula 5

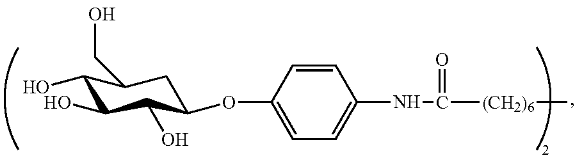

and formula 6

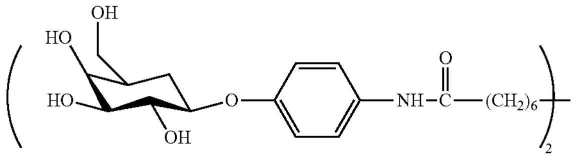

The other preparation conditions and the proportion of each component are the same as those in embodiment 1.

The atomizing liquid gel 5 solution and the atomizing liquid gel 6 solution of these embodiments are directly injected into an aerosol generating device made of a porous material, respectively. After being cooled and gelled, the solution is fixed in the porous material, respectively. The gel-sol phase transition temperature is 230° C. and 235° C., respectively. After repeated smoking for several times, the phase transition properties of the atomizing liquid gel 5 and the atomizing liquid gel 6 are still very obvious. Therefore, the atomizing liquid gel 5 and atomizing liquid gel 6 prepared by these embodiments are suitable for the e-cigarette products that require high-temperature atomization of the atomizing liquid.

Embodiments 7-9

These embodiments provide atomizing liquid gels 7-9 with thermal reversible phase transition characteristics, and the chemical structure formulas of the sugar-based gelling agent used are respectively presented as follows:

formula 7

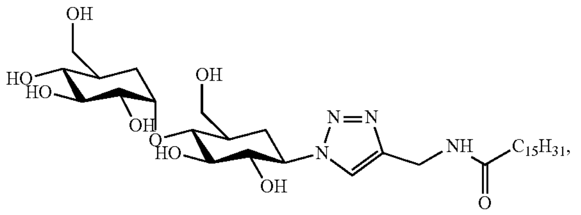

-continued formula 8

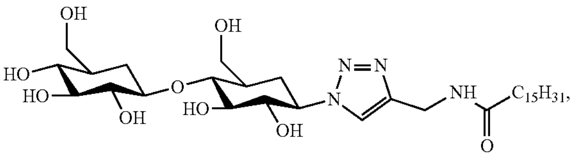

and formula 9

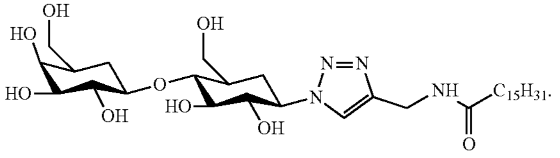

The other preparation conditions and the proportion of each component are the same as those in embodiment 1.

The molten atomizing liquid gel 7-9 solutions of these embodiments are directly coated on an inner surface of a cigarette paper suitable for heat-not-burn cigarettes by sizing. Due to the good creep recovery and thixotropy, the gel can penetrate into the fibrous pores of cigarette paper when heated in the sol state and be fixed in these pores after cooling into a gel. Subsequently, the cigarette paper with fixed gels is made into a heat-not-burn cigarette, and is sucked with the matching combination of the heat-not-burn cigarettes. When the heat-not-burn cigarette is baked at low temperature, the gel in the cigarette paper undergoes a sol-phase transition, and the fixed atomizing liquid is heated and atomized. Moreover, the generated aerosol of atomizing agent, nicotine and aroma component will be released together with the substances evaporated by heating the cigarette filling, which will increase the amount of smoke, and enhance the flavor and fragrance. In the production and storage process of cigarettes, the gel fixed in the cigarette paper remains stable properties due to the thermal stability and chemical stability of the supermolecular structure of the gel.

Embodiment 10

The present embodiment provides an atomizing liquid gel 10 with thermal reversible phase transition characteristics, and the chemical structure formula of the sugar-based gelling agent used is as follows:

formula 10

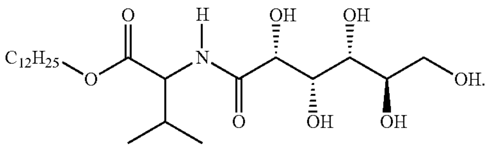

The other preparation conditions and the proportion of each component are the same as those in embodiment 1.

The atomizing liquid gel 10 solution of the present embodiment is directly injected into a liquid storage tank of an e-cigarette atomizer. After the solution is cooled and gelled, an atomizing liquid gel cartridge 10 suitable for e-cigarette is prepared, which is used in the e-cigarette. The gel-sol phase transition temperature is 145° C., which is close to the evaporation and atomization temperature of the atomizing liquid. After being heated to 220° C., the atomizing liquid gel converts from the gel state to a sol state, the atomizing agent fixed in the gel is released together with the dissolved substances of nicotine and aroma components to form an inhalable aerosol. The heating is stopped after smoking a few puffs. When the temperature of the e-cigarette drops below the gel-sol phase transition temperature, the gel at the sol state is recovered to the gel state, and the atomizing agent, nicotine and aroma component molecules that have not been atomized in the gel are refixed in the gel network. It can be seen that the atomizing liquid gel 10 prepared by the present embodiment has obvious thermal reversible phase transition characteristics. After repeated smoking for several times, the phase transition property of the atomizing liquid gel 10 is still very obvious. Therefore, the atomizing liquid gel 10 prepared by the present embodiment is suitable for the e-cigarette products that require high-temperature atomization of the atomizing liquid.

Embodiment 11

The present embodiment provides an atomizing liquid gel 11 with shear reversible phase transition characteristics, and the chemical structure formula of the sugar-based gelling agent used is as follows:

formula 11

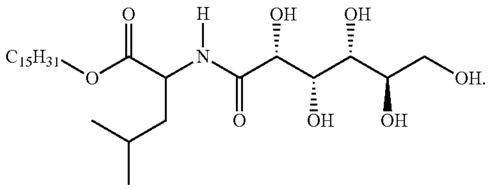

The other preparation conditions and the proportion of each component are the same as those in embodiment 1.

The molten atomizing liquid gel 11 solution of the present embodiment is directly injected into a liquid storage tank of an atomizer, and an atomizing liquid gel cartridge 11 is prepared after the solution is cooled and gelled, which is used in a high-frequency bulk acoustic wave oscillation atomization device. The critical shear stress of the gel-sol phase transition is 200 Pa. Under high shear and violent oscillation (the frequency of sound wave is 2.4 MHz), the gel network structure is destroyed, the viscosity of the gel decreases, and the trapped atomized liquid is released to produce an inhalable aerosol. After smoking for several times, the oscillation is stopped, the gel is quickly self-assembled, and the viscosity of the gel increases again. The above process can be repeated many times. In conclusion, the atomizing liquid gel of the present invention can be applied to a high-frequency bulk acoustic wave oscillation atomization device.

Embodiment 12

The present embodiment provides an atomizing liquid gel 12 with thermal reversible phase transition characteristics, and the chemical structure formula of the sugar-based gelling agent used is as follows:

formula 12

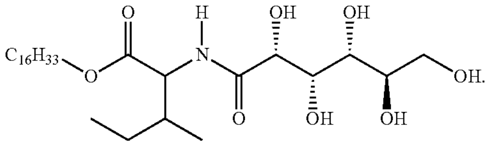

The other preparation conditions and the proportion of each component are the same as those in embodiment 1.

The atomizing liquid gel 12 solution of the present embodiment is directly injected into an aerosol generating device made of a porous material. After being cooled and gelled, the solution is fixed in the porous material. The gel-sol phase transition temperature is 155° C. After repeated smoking for several times, the phase transition property of the atomizing liquid gel 12 is still very obvious. Therefore, the atomizing liquid gel 12 prepared by the present embodiment is suitable for the e-cigarette products that require high-temperature atomization of the atomizing liquid.

Embodiment 13

The present embodiment provides an atomizing liquid gel 13 with thermal reversible phase transition characteristics, and the chemical structure formula of the sugar-based gelling agent used is as follows:

formula 13

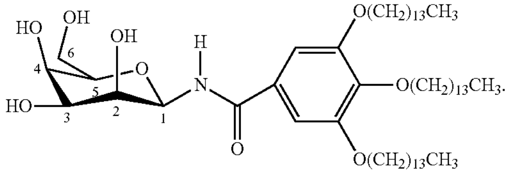

The other preparation conditions and the proportion of each component are the same as those in embodiment 1.

The atomizing liquid gel 13 solution of the present embodiment is directly injected into a liquid storage tank of an e-cigarette atomizer. After the solution is cooled and gelled, an atomizing liquid gel cartridge 13 suitable for e-cigarette is prepared, which is used in the e-cigarette. The gel-sol phase transition temperature is 225° C., which is close to the evaporation and atomization temperature of the atomizing liquid. After being heated to 220° C., the atomizing liquid gel converts from the gel state to a sol state, the atomizing agent fixed in the gel is released together with the dissolved substances of nicotine and aroma components to form an inhalable aerosol. The heating is stopped after smoking a few puffs. When the temperature of the e-cigarette drops below the gel-sol phase transition temperature, the gel at the sol state is recovered to the gel state, and the atomizing agent, nicotine and aroma component molecules that have not been atomized in the gel are refixed in the gel network. It can be seen that the atomizing liquid gel 13 prepared by the present embodiment has obvious thermal reversible phase transition characteristics. After repeated smoking for several times, the phase transition property of the atomizing liquid gel 13 is still very obvious. Therefore, the atomizing liquid gel 13 prepared by the present embodiment is suitable for the e-cigarette products that require high-temperature atomization of the atomizing liquid.

The atomizing liquid gel cartridge 13 is used in a high-frequency bulk acoustic wave oscillation atomization device. The critical shear stress of the gel-sol phase transition is 690 Pa. Under high shear and violent oscillation (the frequency of sound wave is 2.4 MHz), the gel network structure is destroyed, the viscosity of the gel decreases, and the trapped atomized liquid is released to produce an inhalable aerosol. After smoking for several times, the oscillation is stopped, the gel is quickly self-assembled, and the viscosity of the gel increases again. The above process can be repeated many times. In conclusion, the atomizing liquid gel of the present invention can be applied to a high-frequency bulk acoustic wave oscillation atomization device.

Embodiment 14

The present embodiment provides an atomizing liquid gel 14 with thermal reversible phase transition characteristics, and the chemical structure formula of the sugar-based gelling agent used is as follows:

formula 14

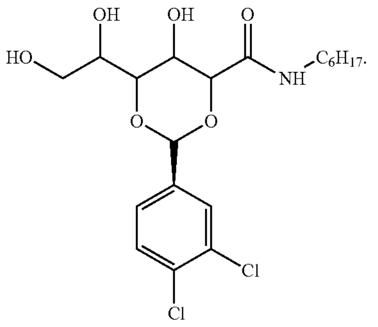

The other preparation conditions and the proportion of each component are the same as those in embodiment 1.

The atomizing liquid gel 14 solution of the present embodiment is directly injected into a liquid storage tank of an e-cigarette atomizer. After the solution is cooled and gelled, an atomizing liquid gel cartridge 14 suitable for e-cigarette is prepared, which is used in the e-cigarette. The gel-sol phase transition temperature is 175° C., which is close to the evaporation and atomization temperature of the atomizing liquid. After being heated to 220° C., the atomizing liquid gel converts from the gel state to a sol state, the atomizing agent fixed in the gel is released together with the dissolved substances of nicotine and aroma components to form an inhalable aerosol. The heating is stopped after smoking a few puffs. When the temperature of the e-cigarette drops below the gel-sol phase transition temperature, the gel at the sol state is recovered to the gel state, and the atomizing agent, nicotine and aroma component molecules that have not been atomized in the gel are refixed in the gel network. It can be seen that the atomizing liquid gel 14 prepared by the present embodiment has obvious thermal reversible phase transition characteristics. After repeated smoking for several times, the phase transition property of the atomizing liquid gel 14 is still very obvious. Therefore, the atomizing liquid gel 14 prepared by the present embodiment is suitable for the e-cigarette products that require high-temperature atomization of the atomizing liquid.

The atomizing liquid gel cartridge 14 is used in a high-frequency bulk acoustic wave oscillation atomization device. The critical shear stress of the gel-sol phase transition is 440 Pa. Under high shear and violent oscillation (the frequency of sound wave is 2.4 MHz), the gel network structure is destroyed, the viscosity of the gel decreases, and the trapped atomized liquid is released to produce an inhalable aerosol. After smoking for several times, the oscillation is stopped, the gel is quickly self-assembled, and the viscosity of the gel increases again. The above process can be repeated many times. In conclusion, the atomizing liquid gel of the present invention can be applied to a high-frequency bulk acoustic wave oscillation atomization device.

What is claimed is:

1. An atomizing liquid gel with reversible phase transition characteristics, comprising:

a sugar-based gelling agent, 0.1-3.0 wt %;

an atomizing liquid, 97.0-99.9 wt %; wherein the atomizing liquid comprises an atomizing agent and nicotine; and wherein a molecule of the sugar-based gelling agent is a sugar molecule introduced with an amide group and/or an aryl group, and the sugar molecule optionally further comprises at least one hydrophobic structural part selected from $—C_xH_y$, $—O—C_xH_y$ and $$—\overset{\displaystyle O}{\overset{\|}{C}}—C_xH_y;$$

and wherein x>2, y>2.

2. The atomizing liquid gel according to claim 1, wherein the sugar-based gelling agent is selected from at least one of five types of sugar-based gelling agents I-V;

wherein a chemical structural formula of the sugar-based gelling agent I is as follows:

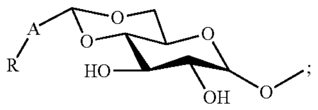

(sugar-based gelling agent I)

wherein,

A is an arylene group, or a heteroarylene group with 1-4 nitrogen heteroatoms; and R is $—C_xH_y$, $—O—C_xH_y$, or $$—\overset{\displaystyle O}{\overset{\|}{C}}—C_xH_y,$$

and x>2, y>2;

a chemical structural formula of the sugar-based gelling agent II is as follows:

$$S—A—NH—\overset{\displaystyle O}{\overset{\|}{C}}—R'$$

(sugar-based gelling agent II);

wherein,

S is a monosaccharide group, a maltose group, a cellobiose group, or a lactose group;

A is the arylene group, or the heteroarylene group with 1-4 nitrogen heteroatoms; and R' is a $C_{2-16}$ alkyl group, a $C_{2-16}$ alkenyl group, or a $C_{2-16}$ alkynyl group;

a chemical structural formula of the sugar-based gelling agent III is as follows:

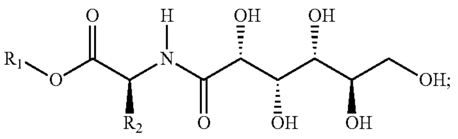

(sugar-based gelling agent III)

wherein, $R_1$ is the $C_{2-16}$ alkyl group, the $C_{2-16}$ alkenyl group, or the $C_{2-16}$ alkynyl group; and $R_2$ is

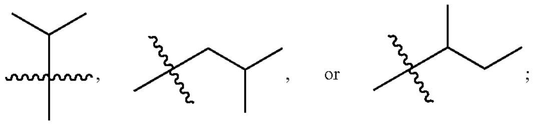

a chemical structural formula of the sugar-based gelling agent IV is as follows:

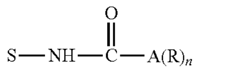

(sugar-based gelling agent IV);

wherein,

S is the monosaccharide group, the maltose group, the cellobiose group or the lactose group; and A $(R)_n$ is

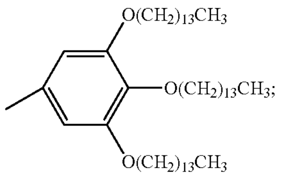

and a chemical structural formula of the sugar-based gelling agent V is as follows:

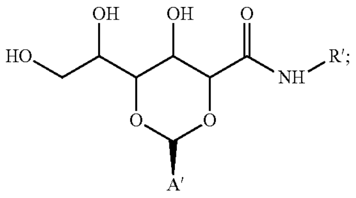

(sugar-based gelling agent V)

wherein,

A' is an aromatic alkylene group, or a heteroarylene alkylene group with 1-4 nitrogen heteroatoms; and R' is the $C_{2-16}$ alkyl group, the $C_{2-16}$ alkenyl group, or the $C_{2-16}$ alkynyl group.

3. The atomizing liquid gel according to claim 1, wherein the sugar-based gelling agent is selected from at least one of five types of sugar-based gelling agents I-V, and wherein the chemical structural formula of the sugar-based gelling agent I is as follows:

formula 1

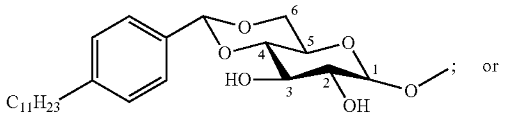

formula 2

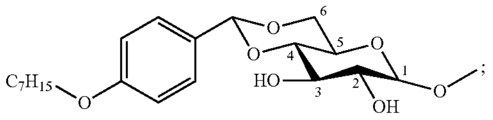

the chemical structural formula of the sugar-based gelling agent II is as follows:

formula 3

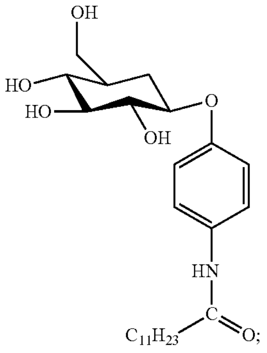

-continued formula 4

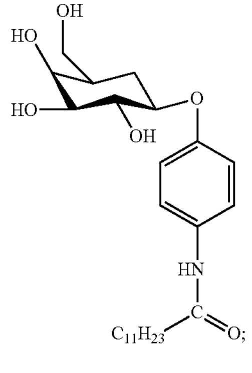

formula 5

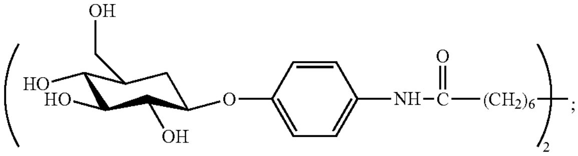

formula 6

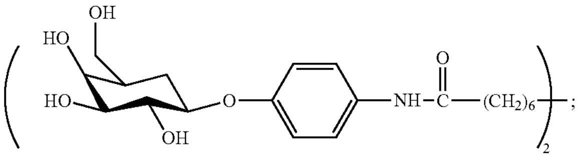

formula 7

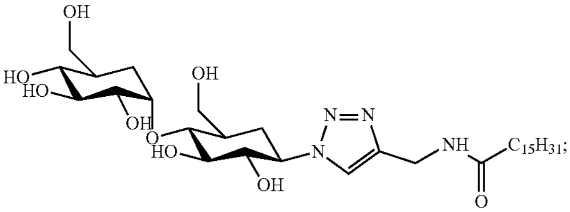

formula 8

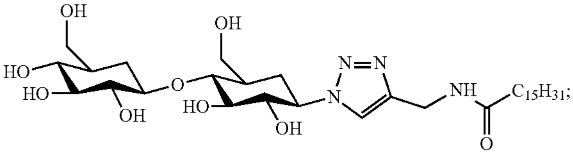

or formula 9

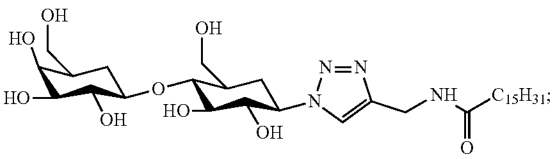

the chemical structural formula of the sugar-based gelling agent III is as follows:

formula 10

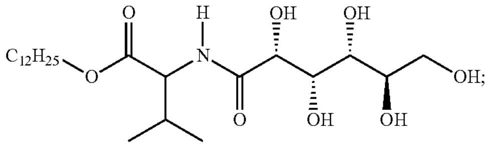

formula 11

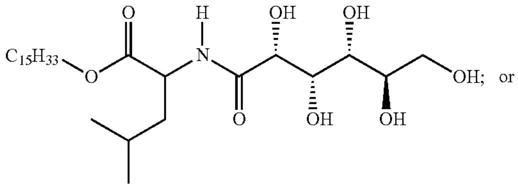

formula 12

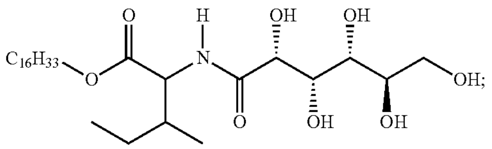

the chemical structural formula of the sugar-based gelling agent IV is as follows:

formula 13

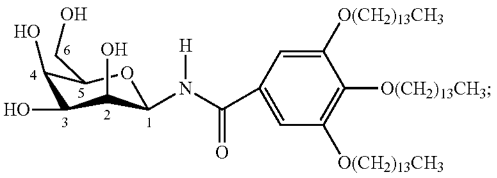

and the chemical structural formula of the sugar-based gelling agent V is as follows:

formula 14

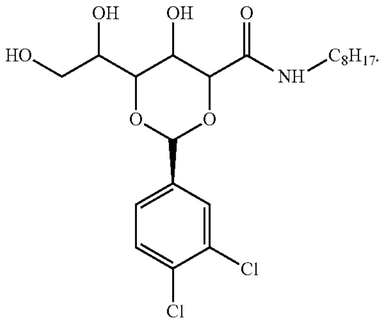

4. The atomizing liquid gel according to claim 1, wherein based on a mass percentage of the atomizing liquid of the atomizing liquid gel, the atomizing liquid comprises:

a perfume, wherein the perfume is 0-10 wt % of the atomizing liquid; and wherein the nicotine is 0-10 wt % of the atomizing liquid; and wherein the atomizing agent is 90-100 wt % of the atomizing liquid and is a mixture of glycerol and propylene glycol, wherein a volume ratio of the glycerol and the propylene glycol is 3:7-7:3.

5. The atomizing liquid gel according to claim 1, wherein the atomizing liquid gel with the reversible phase transition characteristics is the atomizing liquid gel having characteristics of thermal reversible phase transition and/or shear reversible phase transition; a temperature of gel-sol phase transition of the atomizing liquid gel is 100° C.-248° C., and a critical shear stress of the gel-sol phase transition of the atomizing liquid gel is 40-800 Pa.

6. A preparation method of the atomizing liquid gel according to claim 1, comprising: heating and dissolving the sugar-based gelling agent in an atomizing liquid to obtain a mixture, stirring the mixture until the sugar-based gelling agent is completely dissolved, and slowly cooling the mixture to form the atomizing liquid gel.

7. An application of the atomizing liquid gel according to claim 1, comprising: directly injecting a molten solution of the atomizing liquid gel into a liquid storage tank of an electronic cigarette atomizer, and after the molten solution of the atomizing liquid gel is cooled and gelled, an atomizing liquid gel cartridge suitable for electronic cigarettes is obtained.

8. An application of the atomizing liquid gel according to claim 1, comprising: directly injecting a molten solution of the atomizing liquid gel into an aerosol generating device made of a porous material, cooling and gelling the molten solution to obtain the atomizing liquid gel, and fixing the atomizing liquid gel into the porous material.

9. The application according to claim 8, wherein the porous material is selected from a single material or a composite material of a metal, an alloy, ceramics, a microelectromechanical system (MEMS) element, a carbon-based material and a polymer.

10. An application of the atomizing liquid gel according to claim 1, comprising: coating a molten solution of the atomizing liquid gel to an inner surface of a cigarette paper of a heat-not-burn cigarette through sizing, cooling and gelling the molten solution to obtain the atomizing liquid, and fixing the atomizing liquid gel into fiber pores of the cigarette paper.

11. An atomizing liquid gel with reversible phase transition characteristics, comprising:

a sugar-based gelling agent, 0.1-3.0 wt %; and an atomizing liquid, 97.0-99.9 wt %, wherein the atomizing liquid comprises an atomizing agent;

wherein a molecule of the sugar-based gelling agent is a sugar molecule introduced with an amide group and/or an aryl group, and the sugar molecule optionally further comprises at least one hydrophobic structural part selected from —$C_xH_y$, —O—$C_xH_y$ and $$—\overset{\overset{\large O}{\|}}{C}—C_xH_y;$$

and wherein x>2, y>2;

wherein the sugar-based gelling agent is selected from at least one of four types of sugar-based gelling agents I, II, IV, and V;

wherein a chemical structural formula of the sugar-based gelling agent I is as follows:

(sugar-based gelling agent I)

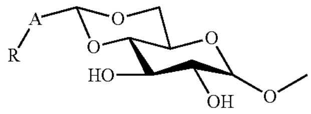

;

wherein,

A is an arylene group, or a heteroarylene group with 1-4 nitrogen heteroatoms; and R is —$C_xH_y$, —O—$C_xH_y$, or $$—\overset{\overset{\large O}{\|}}{C}—C_xH_y,$$

and x>2, y>2;

a chemical structural formula of the sugar-based gelling agent II is as follows:

(sugar-based gelling agent II)

$$S—A—NH—\overset{\overset{\large O}{\|}}{C}—R';$$

wherein,

S is a monosaccharide group, a maltose group, a cellobiose group, or a lactose group;

A is the arylene group, or the heteroarylene group with 1-4 nitrogen heteroatoms; and R' is a $C_{2-16}$ alkyl group, a $C_{2-16}$ alkenyl group, or a $C_{2-16}$ alkynyl group;

a chemical structural formula of the sugar-based gelling agent IV is as follows:

(sugar-based gelling agent IV)

$$S—NH—\overset{\overset{\large O}{\|}}{C}—A(R)_n;$$

wherein,

S is the monosaccharide group, the maltose group, the cellobiose group or the lactose group; and A $(R)_n$ is

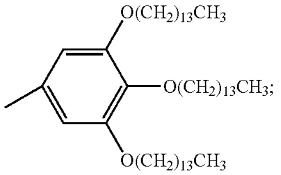

and a chemical structural formula of the sugar-based gelling agent V is as follows:

(sugar-based gelling agent V)

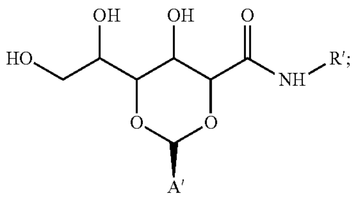

wherein,

A' is an aromatic alkylene group, or a heteroarylene alkylene group with 1-4 nitrogen heteroatoms; and R' is the $C_{2-16}$ alkyl group, the $C_{2-16}$ alkenyl group, or the $C_{2-16}$ alkynyl group.

12. The atomizing liquid gel according to claim 11, wherein the atomizing liquid gel with the reversible phase transition characteristics is the atomizing liquid gel having characteristics of thermal reversible phase transition and/or shear reversible phase transition; a temperature of gel-sol phase transition of the atomizing liquid gel is 100° C.-248° C., and a critical shear stress of the gel-sol phase transition of the atomizing liquid gel is 40-800 Pa.

13. A preparation method of the atomizing liquid gel according to claim 11, comprising: heating and dissolving the sugar-based gelling agent in an atomizing liquid to obtain a mixture, stirring the mixture until the sugar-based gelling agent is completely dissolved, and slowly cooling the mixture to form the atomizing liquid gel.

14. An application of the atomizing liquid gel according to claim 11, comprising: directly injecting a molten solution of the atomizing liquid gel into a liquid storage tank of an electronic cigarette atomizer, and after the molten atomizing liquid gel solution is cooled and gelled, an atomizing liquid gel cartridge suitable for electronic cigarettes is obtained.

15. An application of the atomizing liquid gel according to claim 11, comprising: directly injecting a molten solution of the atomizing liquid gel into an aerosol generating device made of a porous material, cooling and gelling the molten solution to obtain the atomizing liquid gel, and fixing the atomizing liquid gel into the porous material.

16. The application according to claim 15, wherein the porous material is selected from a single material or a composite material of a metal, an alloy, ceramics, a micro-electromechanical system (MEMS) element, a carbon-based material and a polymer.

17. An application of the atomizing liquid gel according to claim 11, comprising: coating a molten solution of the atomizing liquid gel to an inner surface of a cigarette paper of a heat-not-burn cigarette through sizing, cooling and gelling the molten solution to obtain the atomizing liquid gel, and fixing the atomizing liquid gel into fiber pores of the cigarette paper.

18. An atomizing liquid gel with reversible phase transition characteristics, comprising:

a sugar-based gelling agent, 0.1-3.0 wt %; and an atomizing liquid, 97.0-99.9 wt %;

wherein a molecule of the sugar-based gelling agent is a sugar molecule introduced with an amide group and/or an aryl group, and the sugar molecule optionally further comprises at least one hydrophobic structural part selected from —$C_xH_y$, —O—$C_xH_y$ and

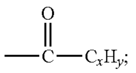

and wherein x>2, y>2; and wherein the atomizing liquid further comprising an atomizing agent, nicotine, and a perfume; wherein the atomizing agent is 90-100 wt % of the atomizing liquid, the nicotine is 0-10 wt % of the atomizing liquid, and the perfume is 0-10 wt % of the atomizing liquid; and wherein the atomizing agent is a mixture of glycerol and propylene glycol, wherein a volume ratio of the glycerol and the propylene glycol is 3:7-7:3.

19. The atomizing liquid gel according to claim 18, wherein the atomizing liquid gel with the reversible phase transition characteristics is the atomizing liquid gel having characteristics of thermal reversible phase transition and/or shear reversible phase transition; a temperature of gel-sol phase transition of the atomizing liquid gel is 100° C.-248° C., and a critical shear stress of the gel-sol phase transition of the atomizing liquid gel is 40-800 Pa.

20. A preparation method of the atomizing liquid gel according to claim 18, comprising: heating and dissolving the sugar-based gelling agent in an atomizing liquid to obtain a mixture, stirring the mixture until the sugar-based gelling agent is completely dissolved, and slowly cooling the mixture to form the atomizing liquid gel.

* * * * *